United States Patent [19]

Doljack

[11] Patent Number: 4,541,063
[45] Date of Patent: Sep. 10, 1985

[54] METHOD AND APPARATUS FOR UPDATING EVENT INFORMATION

[75] Inventor: Frank A. Doljack, Pleasanton, Calif.

[73] Assignee: The B. F. Goodrich Company, Akron, Ohio

[21] Appl. No.: 133,595

[22] Filed: Mar. 24, 1980

[51] Int. Cl.³ .................... G08B 21/00; G06F 15/46
[52] U.S. Cl. .................................. 364/550; 198/856; 364/468; 364/478
[58] Field of Search .............. 364/468, 478, 550-552; 340/676; 198/502, 856; 371/62

[56] References Cited

U.S. PATENT DOCUMENTS

| | | | |
|---|---|---|---|
| 2,451,816 | 10/1948 | Dunn | 340/675 |
| 3,731,113 | 5/1973 | Lowe et al. | 198/856 |
| 3,742,477 | 6/1973 | Enabnit | 340/676 |
| 3,792,459 | 2/1974 | Snyder | 340/676 |
| 3,922,661 | 11/1975 | Enabnit et al. | 198/856 |
| 3,987,429 | 10/1976 | Manduley et al. | 364/478 |
| 4,121,818 | 10/1978 | Riley et al. | 364/478 |
| 4,228,513 | 10/1980 | Doljack | 364/550 |
| 4,229,735 | 10/1980 | Houck | 340/676 |

Primary Examiner—Errol A. Krass
Attorney, Agent, or Firm—Maky, Renner, Otto & Boisselle

[57] ABSTRACT

A monitoring apparatus and method are disclosed for monitoring the occurrence of a plurality of events in a cyclical process. An event transducer detects the occurrence of such events in such process, a progress transducer detects the progress of such process, a search means searches for events by sensing whether respective events occur at expected positions in the progress of such process, and a self-delete means automatically prevents the search means from searching for a prescribed event at its expected position when such prescribed event is not sensed during a predetermined number of cycles of such process. In the preferred form, the monitored process is the cyclical operation of an endless conveyor which is automatically shut down when a rip occurs; the self-delete means reduces unnecessary nuisance shut downs.

32 Claims, 7 Drawing Figures

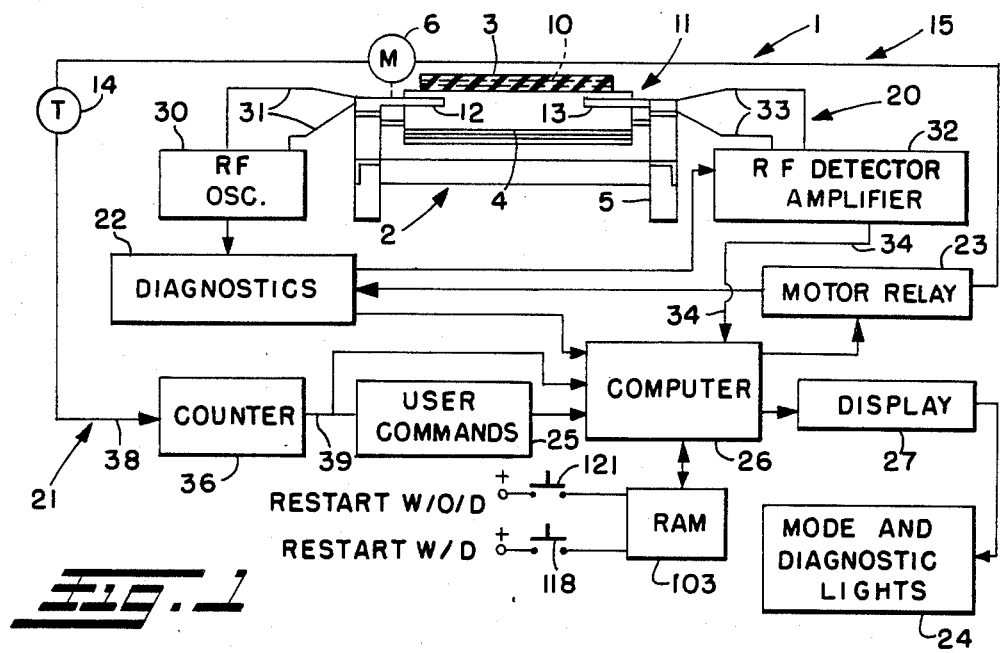
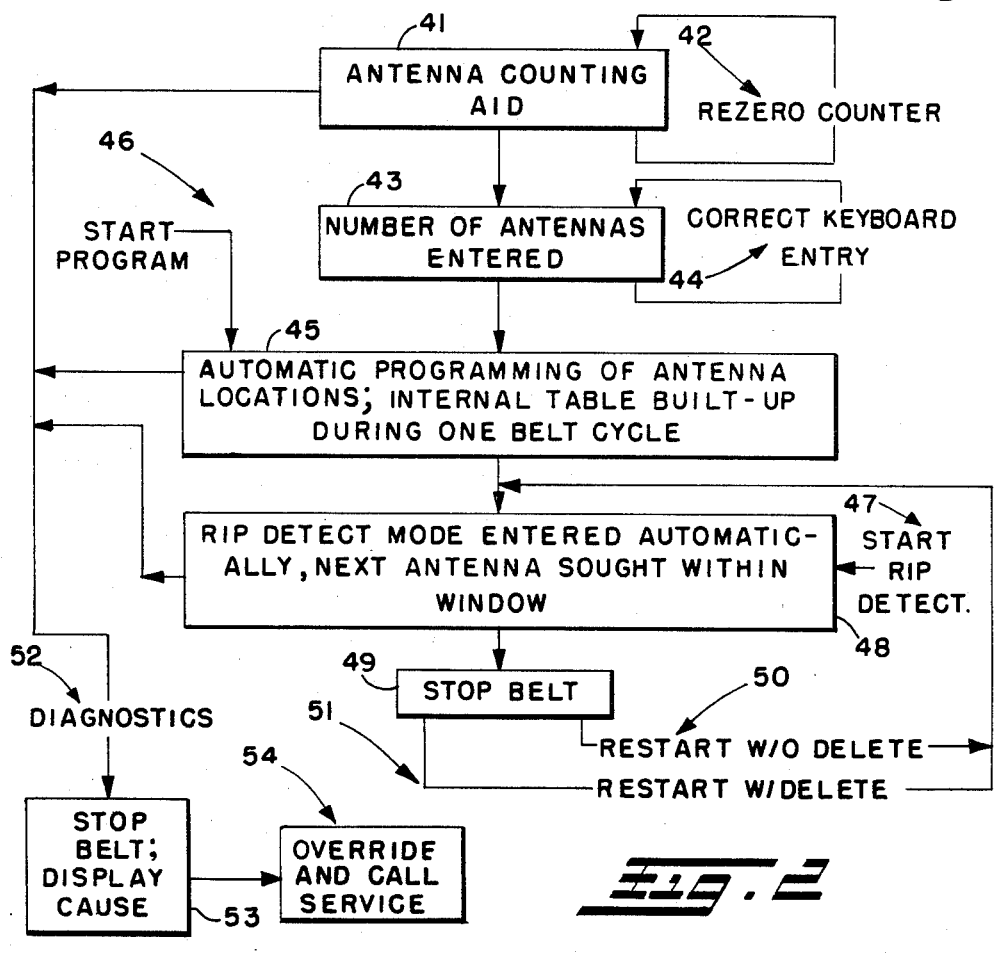

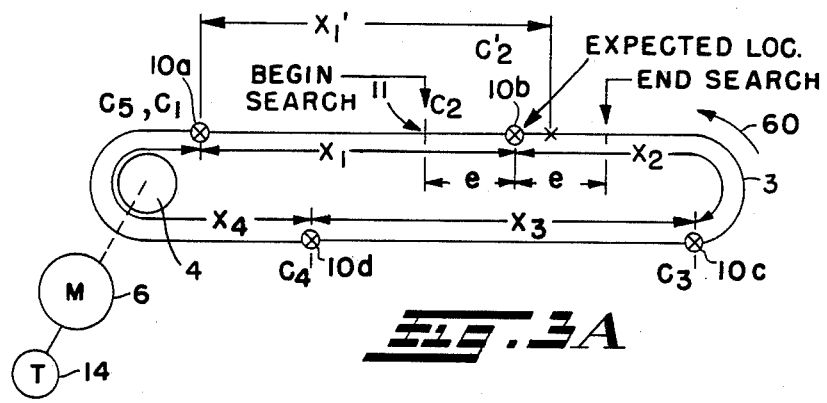
FIG. 3A
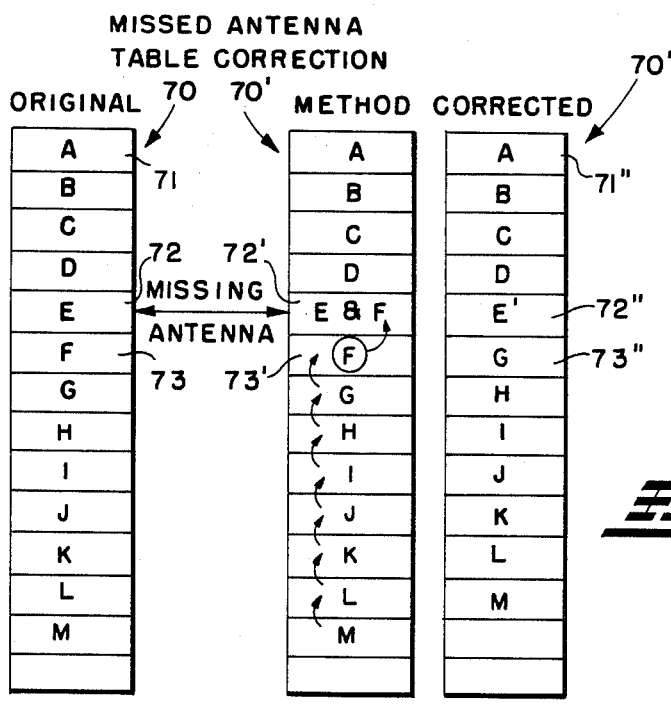
FIG. 3B
FIG. 4

METHOD AND APPARATUS FOR UPDATING EVENT INFORMATION

TECHNICAL FIELD

The present invention relates to monitor systems and methods for detecting whether successive events occur at their proper positions in a process and, more particularly, to means for reducing nuisance shutdowns of the process when certain events are not detected. Moreover, the invention is particularly directed to such a monitor system and method for rip detector purposes for conveyor belts and the like.

BACKGROUND

In large endless non-metallic conveyor belts used to convey bulk material, there is a possibility of encountering a rip in the belt, for example, by a sharp object dropped thereon at the loading station. It is desirable promptly to detect such rips and, preferably, to shut down the conveyor belt upon such detection, thereby minimizing damage to the belt. One such conveyor belt rip detector is disclosed in U.S. Pat. No. 3,792,459. In such rip detector plural antennas, which may be single electrical conductors, are embedded in the belt transversely to its length at spaced-apart locations in the belt. An electrical signal is coupled by respective antennas from a transmitter to a receiver as the belt moves and the respective antennas pass in capacitive coupling relation with the transmitter and receiver at a rip detector station, and the receiver thus delivers an input signal to detector circuitry which interprets the same as an indication of satisfactory belt integrity. However, a broken antenna, for example at a place where the belt has been ripped, will not couple the transmitter signal through to the receiver, and the detector then senses the same as an indication of the occurrence of a rip condition. The detector circuit in such patent is operative after the lapse of a predetermined time period corresponding to the passage of a given number of broken antennas past the rip detector station to produce a distinguishable output that activates an alarm and/or deactivates the conveyor belt drive.

A number of improvements for use in conveyor belt rip detectors are disclosed in co-pending U.S. patent application Ser. No. 960,424, filed Nov. 13, 1978, for "Monitor System and Method for Detecting Sequential Events in a Cyclical Process", now U.S. Pat. No. 4,228,513, issued Oct. 14, 1980, and assigned to the same assignee as the present application. One of such improvements includes a means for detecting the progress of the conveyor belt to know when an antenna should be at the rip detector station. If there is no antenna present then, a prompt shut-down of the conveyor belt drive may be effected. Improvements in the monitor system and method disclosed in U.S. patent application Ser. No. 960,424 now U.S. Pat. No. 4,228,513, issued Oct. 14, 1980, are disclosed in copending commonly assigned U.S. patent application Ser. No. 126,218, filed Mar. 3, 1980, of Frank A. Doljack entitled "Signal Detector Circuit With Gain Control Gain now U.S. Pat. No. 4,349,883.

The disclosures of such copending U.S. patent applications Ser. No. 960,424 now U.S. Pat. No. 4,228,513 issued Oct. 14, 1980 and Ser. No. 126,218 now U.S. Pat. No. 4,349,883 are hereby incorporated by reference.

It has been found that due to wear of antennas in a conveyor belt ultimately possibly causing a break in the antenna, the signal coupling efficiency of the antenna may decrease to a marginal level or signal coupling may even terminate completely, even though the actual integrity of the conveyor belt itself is undisturbed. In the past such antenna problems would cause a nuisance shut-down (stopping) of the conveyor belt requiring a deliberate re-start of the belt by a field worker even though nothing catastrophic had occurred to the belt. Such nuisance shut-downs are costly in terms of lost productivity and wasted labor to re-start the system.

One prior approach to reduce nuisance shut-downs was to require the rip detector to sense that there are five or even more sequential antennas missing in the belt before stopping the belt. However, a drawback to this approach is the loss in sensitivity or accuracy of the rip detector equipment as it monitors the entire belt and, in the case of a real rip, an increase in the length thereof before shut-down occurs.

Thus, it would be desirable to avoid nuisance shut-downs of a monitored cyclical process while minimizing loss of sensitivity or accuracy of the monitoring function.

SUMMARY OF INVENTION

In the present invention a monitor system and method stop the monitored process when two (or more, if desired) consecutive events are missed. Furthermore, the process monitor can automatically delete from its memory singly-missed events. These singly-missed events are usually caused by defective components and are no longer desired anyway or useful in the monitoring process. This self-deletion feature avoids needless process shut-downs and provides more trouble-free operation of the monitor to the user.

According to one aspect of the invention, a monitoring apparatus for monitoring the occurrence of a plurality of events in a cyclical process, includes event transducer means for detecting the occurrence of such events in such process, progress transducer means for detecting the progress of such process, search means for searching for events by sensing whether respective events occur at expected positions in the progress of such process, and self-delete means for automatically preventing said search means for searching for a prescribed event at its expected position when such prescribed event is not sensed during a predetermined number of cycles of such process.

According to another aspect, the event transducer means is a conveyor belt rip detector means for monitoring the integrity of a conveyor and such process comprising cyclical operation of such conveyor, including a transmitter and a receiver, and signal coupling means associated with such conveyor for periodically, according to the progress of such conveyor, coupling a signal from said transmitter to said receiver, as an indication of such event and, thus, of such integrity, and the self-delete means includes means for automatically preventing when said signal coupling means is ineffective to couple at least a signal of predetermined magnitude between said transmitter and receiver.

According to another aspect, a method for automatically monitoring the occurrence of a plurality of events in a cyclical process, includes storing information concerning the expected position of each event in such process, detecting the occurrence of such events in such process, simultaneously detecting the progress of such process, sensing whether respective events occur at expected positions in the progress of such process, and automatically preventing such detecting and sensing for a prescribed event at its expected position when such prescribed event has not been sensed during a predetermined number of cycles of such process.

In accordance with another aspect of the invention wherein such process is the operation of an endless type conveyor belt, said step of detecting the occurrence includes checking specified portions of such conveyor belt as they pass a rip detector station to find a rip in the conveyor belt whereby an undetected event as its expected position during said sensing step may be interpreted as a rip in the conveyor belt, said checking includes coupling a signal from a transmitter to a receiver each time an event occurs, and said automatically preventing includes preventing such checking when during the corresponding checking of a predetermined specified portion of such belt in a preceding cycle of such belt a signal had not been coupled between such transmitter and receiver.

In accordance with the invention, a warning shutdown also may be effected automatically when a predetermined number of events has been deleted, i.e. the monitor system is prevented from looking for them.

With the foregoing in mind, it is a primary object of the invention to provide improvements for a monitor system and method and especially for such a system and method used in connection with conveyor belt equipment for detecting rips in the belt.

Another object of the present invention is to improve the efficiency of operation of a monitor system and method while maximizing accuracy, especially such used in connection with the detection of rips in a conveyor belt.

A further object is to reduce nuisance shut-downs of a monitored cyclical process, such as the operation of a conveyor belt.

An additional object is to minimize such nuisance shut-downs by reducing sensitivity or accuracy of the process monitoring only at localized areas of the process.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of various ways in which the principles of the invention may be employed.

BRIEF DESCRIPTION OF THE DRAWINGS

In the annexed drawings:

FIG. 1 is a schematic system diagram of a conveyor belt system with which the conveyor belt rip detector monitor system including the signal control apparatus of the invention may be used;

FIG. 2 is a flow chart diagram illustrating the several operating modes of the monitor system;

FIG. 3A is a schematic representation of the antennas of a conveyor belt depicting their cyclical passage as respective events detected by the monitor system;

FIG. 3B is a chart illustrating the internal table stored in the monitor system as a representation of the distances between adjacent antennas;

FIG. 4 is a chart illustrating the method of tabular correction of such internal table when an event is deleted therefrom;

DETAILED DESCRIPTION OF INVENTION

Figure 5:
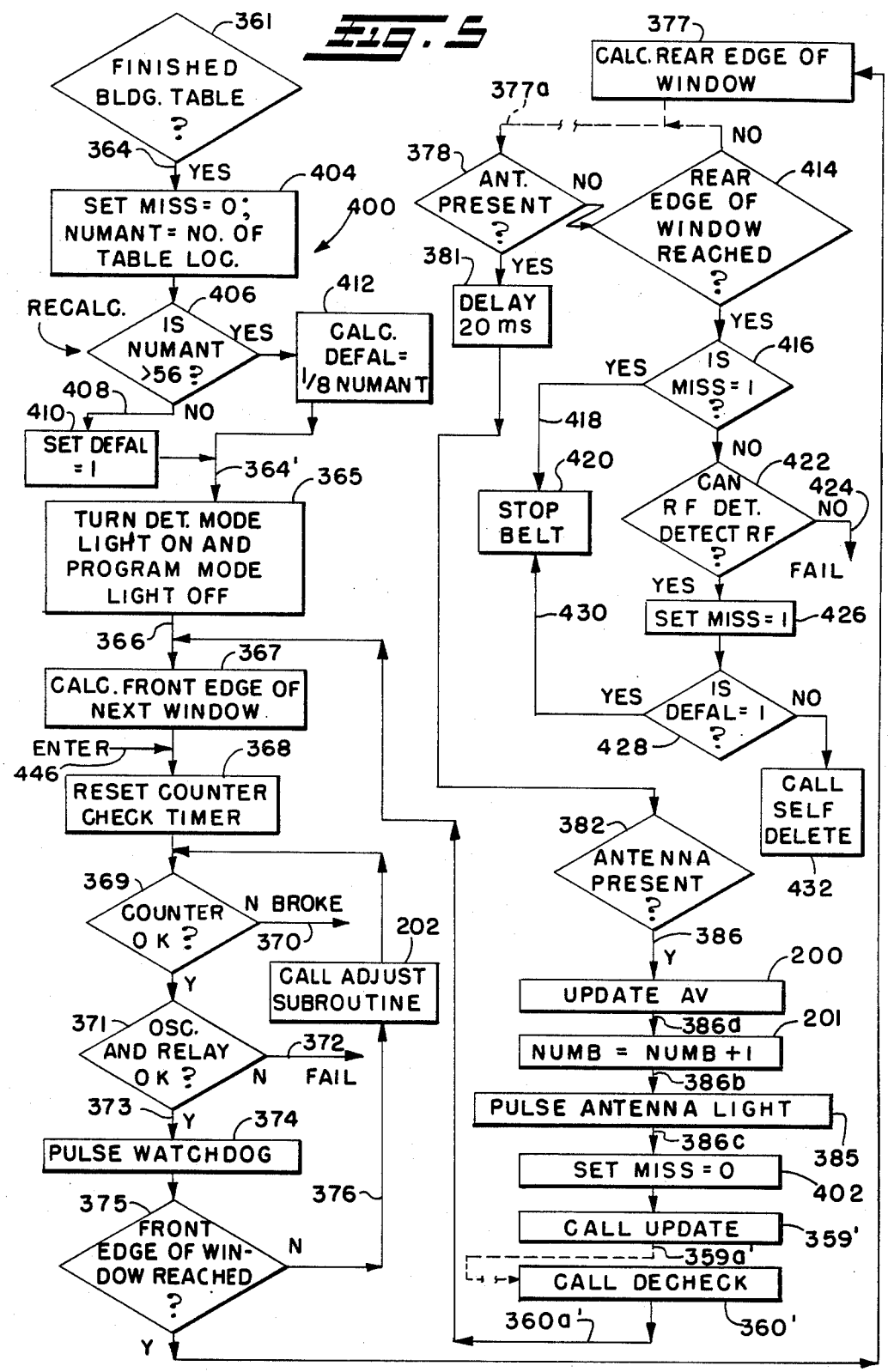
FIG. 5 is a partial representative flow chart of procedures and steps followed in operation of the monitor system in accordance with the method of the invention, the procedures and steps illustrated in FIG. 5 and designated by a reference numeral exceeding 300 and less than 400 corresponding to those of the same number disclosed in U.S. patent application Ser. No. 960,424 now U.S. Pat. No. 4,228,513, issued Oct. 14, 1980, as modified in accordance with the present invention described in detail below.

The following description of the preferred embodiment and best mode of the present invention will be described in connection with a conveyor belt system in which the monitor system is used as a conveyor belt rip detector system and the signal control apparatus or circuit is used in such rip detector system. It will be appreciated, however, that the monitor system may be used in connection with other systems for monitoring cyclical events and the signal control apparatus or circuit may be used also in other systems.

Referring now in detail to the drawings, and initially to FIGS. 1 and 2, which correspond to FIGS. 3 and 4 of U.S. patent application Ser. No. 960,424, now U.S. Pat. No. 4,228,513, issued Oct. 14, 1980, a monitor system generally indicated at 1 is shown in association with a conveyor belt system 2 for detecting a rip, tear, or other similar flaw (hereinafter collectively "rip") in the conveyor belt 3. The belt 3, which may be a conventional endless, non-metallic conveyor belt, is supported by rollers 4 at longitudinal stations along a support frame 5 and is driven by a motor 6 which turns at least one of the rollers 4, referred to as a drive roller.

The transducer technique for observing the structural integrity, or lack of the same, e.g. a rip, of the belt 3 uses a pluralitty of antennas 10 embedded in or otherwise carried by the belt generally transversely to the travel direction thereof and at a rip detector station 11 a transmitter plate 12 and a receiver or detector plate 13. Each antenna 10 preferably is a single electrical conductor of relatively small gauge, or other type of electrical conductor, intended, when passing the station 11, capacitively to couple with the transmitter and receiver plates 12, 13 to couple an electrical signal therebetween. (It will be appreciated that other types of signal coupling may be employed by the antennas or other means carried by the belt.) Such signal coupling indicates the structural integrity of the antenna and proximate portions of the belt 3; the lack of such signal coupling where it is expected to occur generally indicates a flaw, such as a break in the antenna and a rip in the proximate portion of the belt 3.

The efficiency of such signal coupling at the rip detector station may be affected by wear of an antenna, a transmitter or receiver plate, or the belt itself, by stretching or contraction of the belt, by accumulated dirt, by other means causing a change in the distance between any antenna and the transmitter and receiver plates, etc., thus causing, for example, a change in the magnitude or total loss of the signal ultimately received by the receiver plate and delivered as an input signal to the downstream circuitry associated therewith. A principal function of the invention is to minimize nuisance shut-downs of the process caused by the signal delivered to the downstream circuitry being below a predetermined magnitude or non-existent. As used herein "predetermined magnitude" may mean an exact magnitude or a range of magnitudes that are at a satisfactory level or value.

As the belt 3 progresses in its process of traveling along its length, the monitor system 1 continuously looks for the sequential cyclical occurrence of events, namely the passing of the respective antennas by the rip detector station 11. The monitor system 1 also particularly observes the progress of such process, for example by monitoring the rotation or output of the motor 6 or rotation of the drive roller with a conventional tachometer 14, and correlates such progress information with the detected event information to sense promptly when an event has been missed. Upon missing an event, the monitor system 1 may promptly stop the motor 6 to shut down the conveyor belt system 2 minimizing any rip damage to the belt 3.

The fundamental components of the monitor system 1 include an event detector 20, a progress detector 21, a diagnostics portion 22, a shut-down control portion 23, an output indicator portion 24, a user command portion 25, a comparator portion 26, such as a computer, and preferably a microcomputer, that stores and compares information received from the various portions of the monitor system and effects appropriate control in response to such information, and a display portion 27.

The event detector 20 is coupled to an event transducer including the transmitter and receiver plates 12, 13 at the rip detector station 11 in proximity to the belt 3 for capacitive coupling to and through an antenna 10. The detector 20 includes an oscillator 30, which produces an AC electrical signal, preferably in the radio frequency range, for example, on the order of about 200 KHz, delivered by an electrical connection 31 to the transmitter plate 12; and a detector amplifier 32 coupled to the receiver plate 13. When an antenna 10 passes in proximity to the transmitter plate 12 such AC signal is capacitively coupled to the antenna. Moreover, assuming such antenna is whole, i.e. in particular there is no rip in the belt 3 at that location, such signal will be capacitively coupled from the antenna to the receiver plate 13 for delivery via an electrical connection 33 as an event signal to the detector-amplifier 32. The detector-amplifier 32 preferably is primarily responsive only to an event signal that has a frequency at least approximately equal to the AC signal produced by the oscillator 30; accordingly, the detector-amplifier 32 preferably is a radio frequency responsive device. Receipt of a proper event signal is communicated as an event detect signal by a connection 34 to the computer in the comparator portion 26. Thus, the event signal is an input signal to the detector amplifier 32 and the event detect signal is an output signal therefrom.

Progress of the belt movement is detected by the progress detector 21, which may include a progress transducer in the form of a tachometer 14 and a counter 36. The tachometer 14 is connected to the conveyor belt drive motor 6 or drive roller 4 (FIG. 3A) and produces in conventional manner a series or train of electrical pulses on line 38. The frequency of such pulse train preferably is directly proportional to the rotational speed of the motor 6 and, accordingly, directly proportionally represents the progress of the belt 3 as it is driven along its path. The counter 36 converts the serial pulse train information from the tachometer 14 to parallel binary data, such as a 16 bit binary number, the progress signal, which also directly represents progress of the belt 3 and is delivered on a bus 39 to the computer in comparator portion 26.

Briefly, in operation of the monitor system 1 observing the belt 3 to sense whether a rip has occurred, information concerning the relative interval distances between each pair of adjacent antennas is obtained and stored during one cycle of the belt 3. Using such information, the monitor system sequentially looks for each antenna at its expected position, within a tolerable window of error or offset. The relevant interval distance information is updated each time an antenna is detected. However, when an antenna is missed, i.e. it is not sensed at its expected position, the monitor system 1 stops the belt 3.

More particularly, the computer 26, when it receives an event detect signal on line 34, reads and stores the progress signal on bus 39. When the next event detect signal is received, the computer 26 again reads and stores the progress signal on the bus 39. The value of the difference between the two progress signals, then, represents the distance between the two adjacent antennas 10 that passed the rip detector station 11 to produce the two event detect signals. This procedure is repeated to obtain information concerning the distances between each pair of adjacent antennas. Such information is measured or detected and is stored, for example in a table, e.g. see FIGS. 3B and 4, during a programming mode of operation of the monitor system 1. After the table has been completed with information concerning the distances between every pair of adjacent antennas, the monitor system 1 can operate in a rip detect mode. More particularly, in the rip detect mode the computer 26 compares the progress signal on bus 39 with the relevant value of information from the stored table to determine when an antenna 10 should be present at the rip detector station 11. If there is a whole antenna properly positioned at the rip detector station 11 in capacitive coupling relation with the transmitter and receiver plates 12, 13 at that time, meaning that the conveyor belt 3 also is whole, then the monitor system begins looking for the next antenna. However, if, when expected, there is no antenna present at the rip detector station 11 or the antenna then present is broken, indicating a conveyor belt system 2 fault or a belt rip, respectively, no event detect signal will be delivered to the computer 26; accordingly, the computer 26 promptly declares the event missing and operates the start stop control portion 23 to stop the belt 3 in order to minimize any damage thereto.

Preferably the start stop control portion 23 is a relay that controls energization and de-energization of the motor 6 and/or a conventional clutch and braking system for the conveyor belt system 2. Operation of the relay 23 by the computer 26, then, determines whether or not the conveyor belt 3 will move. In the output indicator portion 24 plural mode lights and diagnostic lights, which are operated by the computer 26, indicate the operational mode of the monitor system 1 and the reason for any detected failure or shut-down of the conveyor belt system 2. The user command portion 25 may include a plurality of manually operated pushbutton controls or connections to receive electrical input control information from external equipment, such as a remote control panel, electronic control equipment, etc., to effect operational control of the monitor system.

The several operating modes for the monitor system 1 are depicted in a functional block diagram in FIG. 2. The monitor system 1 may be used as a counting aid for antennas or other events detected by the monitor system, block 41. This function is particularly useful when the antennas are embedded in a conveyor belt and are not ordinarily visually discernible. In such counting aid mode of operation, a user puts a reference mark on the belt 3, enters by user command portion 25 a rezero command for an internal counter in the computer 26 to cause the display 27 to show a zero count value, as represented at 42, and enters an input command to the monitor system 1 to start the conveyor belt system 2, e.g. by closing relay 23. As each whole antenna passes and is counted at the rip detector station 11, the event detect signal on line 34 causes the computer 26 to increment the value shown on the display 27. When the reference mark returns to the rip detector station, the value shown on the display 27 will indicate the number of whole antennas in the belt 3 detectible by the event detector 20. With the number of antennas or other events known, the user may enter that information to the computer 26, box 43, for example by a conventional keyboard, as represented at 44, of the user command portion 25. The user would then enter a command to the computer 26 via the keyboard or other switch, for example, to cause the monitor system to commence operation in the programming mode to build the table of information on the distances between adjacent pairs of antennas. The use of the monitor system 1 as an event counting aid and the just described keyboard entry of events to the monitor system are, however, alternate embodiments to the best mode of the present invention.

In box 45 the automatic programming mode of the antenna locations and the building of the internal table during one belt cycle is presented. According to the best mode of the invention, a user may put a reference mark on the conveyor belt 3 at the rip detect station 11 and enter a start programming command, represented at 46, to start the conveyor belt system to build up the table of relative distance information. When the reference mark returns to the rip detector station 11, the user may enter a start rip detect command signal, represented at 47, for example by a further switch that delivers an appropriate signal to the computer 26, to cause the monitor system 1 automatically to observe the condition of the belt 3 to sense a rip therein. Such rip detect mode of operation is represented at box 48.

As an alternate embodiment to the best mode of the present invention, the computer 26 may be programmed to cause the monitor system 1 automatically to enter the rip detect mode. In this alternate embodiment, the number of antennas would have to be entered, box 43, as aforesaid. The monitor system, than, would automatically build the table of information for that number of antennas; upon completion of the table, the monitor system 1 automatically would enter the rip detect mode, box 48.

During operation of the monitor system 1 in the rip detect mode, according to the information contained in the table, the monitor system 1 will look for each successive antenna at its anticipated position relative to the progress of the belt 3. In order to take into consideration the possibility of slippage, stretching and the like of the conveyor belt during its operation and life expectancy, as well as other similar inaccuracies in the actual position of respective antennas, a window of error is permitted preferably on both sides of the anticipated position of each antenna. Therefore, the monitor system 1 will look for an antenna slightly before it expected arrival at the rip detector station 11 and for a brief period after the expected arrival; if no antenna is detected within the permitted window, the monitor system 1 promptly stops the conveyor belt system 2, as shown at box 49. However, when the monitor system 1 does detect an antenna within an expected window, the actual position of that antenna, as detected by the progress detector 21, relative to the position of the preceding antenna, is input at the appropriate location in the table to update the same, thereby allowing the tabular information to vary gradually within prescribed limits.

Whenever the monitor system 1 shuts down the conveyor belt system 2 due to a missed antenna, the user may restart the conveyor belt system, usually after having visually inspected the belt. As is shown at 50, such restart may be without deleting the information concerning the missed antenna from the table to check, for example, whether the shut-down was due only to an inadvertently broken antenna. If the missed antenna were broken, even though the belt is otherwise intact, the monitor system 1 would shut down the conveyor belt system 2 at the completion of the next cycle. Usually the control for this type of restart operation would be accessible to a user in the field. However, if the monitor system 1 and conveyor belt system 2 were to be restarted with deletion from the table of the information concerning the broken antenna, say, as indicated at 51, then the system would continue operating in rip detect mode without looking for the suspect antenna during the subsequent cycles of operation of the conveyor belt. This latter type of restart operation ordinarily would be accessible only to a qualified serviceman, who would be expected to check the belt 3 and system 1 thoroughly before deleting the information concerning the suspect antenna from the table.

As is shown at 52 in FIG. 2, the diagnostics portion of the monitor system 1 continuously checks various portions of the system to assure proper operation thereof. In the event of a failure being detected by the diagnostics portion, the monitor system 1 will promptly stop the belt and will energize the mode and diagnostic lights indicators portion 24 appropriately to display the reason for shut-down, box 53. Moreover, the monitor system may be overridden manually by the user, box 54, to continue operation of the conveyor belt system 2 without rip detection by the monitor system 1. Ordinarily, such overriding would occur when it is believed that a failure has occurred in the monitor system 1 while the conveyor belt 3 remains intact.

Referring to FIGS. 3A and 3B, operation of the monitor system 1 in a programming cycle to build the interval distance table will be described. The exemplary conveyor belt 3 in FIG. 3A contains four antennas 10a through 10d, which pass the rip detector station 11 sequentially alphabetically as the belt is driven in the direction of arrow 60. To measure the four distance intervals between adjacent pairs of antennas, five event signals must be sensed at the station 11, i.e. the first sensed antenna must pass the station twice so that the distance between that first and the second antennas can be measured and the distance between the last and that first antennas can be measured.

Accordingly, when the first antenna 10a passes the station 11, this event already having occurred in FIG. 3A, the value of $C_1$ of the count on the counter 36 is read and stored by the computer 26. Subsequently when the next antenna 10b passes the station 11, causing a subsequent event detect signal, the computer 26 again reads the value of the count, this time $C_2$, on the counter 36. The computer 26 takes the difference between the values $C_2$ and $C_1$, as is illustrated in FIG. 3B, and places that difference value $X_1$ in a first memory location 61 in the table 62. The distance interval value $X_1$, then, is directly proportional to the actual physical distance between the two antennas 10a, 10b. The other antennas in the belt 3 are similarly detected during one complete cycle of the belt and similar calculations are made and information is stored to complete the table 62 with the distance interval values $X_2$ through $X_4$ being stored in memory locations 63 through 65. Upon completing the table 62, the monitor system 1 is promptly operable as aforesaid in a rip detect mode to look for each antenna at its expected position in the belt 3. In view of the foregoing, it will be clear that the monitor system 1 may commence its programming mode without regard to which antenna is the first detected; in other words, no reference location or antenna is required as long as programming occurs through one complete cycle of the process-belt travel.

Operating in the rip detect mode, the monitor system 1 promptly upon sensing the antenna 10a at the station 11 reads the count value on the counter 36. Then, the computer 26 adds the value $X_1$ from the first location 61 in the table 62 to that counter count value to determine the expected count value that should be on the counter when the next antenna 10b is sensed at the station 11. It is possible that the next antenna may not be exactly at its expected position due, for example, to belt slippage, stretching, and the like. Therefore, the user of the monitor system 1 may enter into the same an offset value or amount that defines a window of error on opposite sides of the exact expected position of the next antenna. For example, the offset value "e" may be subtracted and added, respectively, relative to the count value anticipated to be on the counter 36 when the next antenna is expected to pass the station 11, as is illustrated in FIG. 3A on opposite sides of the antenna 10b. In the rip detect mode, the monitor system will look for the arrival of the antenna 10b at the station 11 when the value on the counter 36 equals the count value $C_2$ minus the offset value e and will continue looking for that antenna until it is found or until the value on the counter 36 exceeds the value $C_2$ plus the offset value e. If the expected antenna is not found within the tolerable window of error, the monitor system 1 promptly declares the event as missing and operates the relay 23 to stop the conveyor belt system 2.

Moreover, to accommodate continuous errors, for example as the belt 3 continues slipping or stretching during its use, the table 62 is continuously updated with count value information from the counter 36 as an indication of the actual position of each antenna as it passes the rip detector station 11 during each cycle of the conveyor belt 3. When an antenna, such as the antenna 10b, is actually found within a window of error, but not exactly at its expected count value position $C_2$, the actual count value on the counter 36 is subtracted from the count value at which the prior antenna was found to obtain a value $X_1'$. This relative distance value $X_1'$, then, is substituted in the table 62 at location 61 to replace the prior value $X_1$. In this manner the relative interval distance information is continuously updated to maintain accuracy of the monitor system 1 in performing its event detecting, namely, rip detecting, function.

Since the values stored in the table 62 only represent relative interval distance information without regard to the actual or absolute count value on the counter 36 at any given time, the counter 36 actually may count through more than one complete counting cycle of, for example, $2^{16}$ counts, according to the preferred embodiment, during any one complete cycle of the monitored process. Thus, the monitor system is versatile in that it is capable of monitoring cycles that are longer than an interval counting cycle of the monitor system counter. Moreover, since the monitor system 1 always looks for the next antenna on the basis of updated information concerning a previously detected antenna combined with information concerning the expected distance to the next antenna accuracy of detection and promptitude of shut down are maintained.

In some circumstances an event may be deleted from a process, i.e. to preclude the monitor system 1 from searching for a particular event either using the self-delete feature of the invention or by a manual effort. For example, if an antenna has broken and is undetectable at the station 11, although the belt 3 is not ripped, or such antenna is erratic, e.g. on the verge of breaking, such that its signal coupling efficiency has diminished appreciably, information concerning that broken antenna should be deleted from the table stored in the monitor system 1 so that the belt will not stop each time that broken antenna passes the station 11.

The method for deleting from the table information concerning a broken antenna, or other missed event, is illustrated in FIG. 4. In the table 70 information concerning the interval distances A–M for thirteen pairs of adjacent antennas is shown. In memory location 71 the value A represents the interval distance between a first and second antenna. In memory locations 72 and 73 the values E and F, respectively, represent the interval distances between fifth and sixth antennas and sixth and seventh antennas. In the course of operation of the monitor system 1, if the sixth antenna breaks and it is desired to delete such antenna from the table, either because it is unlikely that such break resulted from a rip in the conveyor or because such break had already caused the monitor system 1 to stop the conveyor belt system 2 such that a user, usually after visually inspecting the belt 3 to assure it is not ripped, would be required to restart the belt, such antenna may effectively be deleted from the table. Such deletion is effected according to the table 70', as follows:

The monitor system 1 is prevented from looking for the broken sixth antenna while assuring that the system will look, after detecting the fifth antenna, for the original seventh antenna. The seventh antenna is a distance proportional to the sum of values E and F from memory locations 72, 73. These values E and F are added by the computer 26 and the sum is stored in memory location 72' of the table 70', which is the same as memory location 72 in table 70, but with the thusly revised information. Moreover, all of the values G through M stored in the table below memory location 73' are moved up one memory location in table to avoid leaving any "holes" in the table. Thus, the value G is moved up to memory location 73', and so on. The corrected table, then, is shown at 70'', including for example, at memory locations 71'', 72'', 73'', respectively, values A, E' (equal to the sum of original values E and F), G. It will be appreciated that although there is an empty memory location at the end of the table after the location at which value M is stored, by using a conventional end of file notation, the computer 26 can accurately keep track of the number of values in the table and, thus, antennas or other events to be monitored in the process.

Turning now briefly to FIG. 5, a partial compilation of the computer program flow chart disclosed in U.S. patent application Ser. No. 960,424 now U.S. Pat. No. 4,228,513 issued Oct. 14, 1980 is presented. The following brief description concerning FIG. 5 summarizes the more comprehensive disclosure, particularly relating to FIGS. 10C and 10D of such copending application. FIG. 5 here also includes relevant parts of the flow chart of FIG. 5 in the latter Doljack application mentioned above. The purpose of FIG. 5 here is to depict a tie in of the features of the present invention with those of the other applications.

After the table of information concerning the relative locations of the antennas 10 in the belt 3 has been completed at block 361, following line 364, an initializing subroutine 400 for the self-delete operational method described further below, and line 364', to block 365 the detect mode light and program mode light, which are not shown here, are turned on and off, respectively. Following line 366 to block 367 the front edge of the next window is calculated and then a sub-routine of reset counter check timer is called in block 368. Thereafter a check is made of the operation of the counter, oscillator and relay at blocks 369 and 371; if there is a problem the system enters a failure mode via line 370 or 372; if these are properly operational, the watchdog timer is pulsed at block 374 and then inquiry is made at block 375 whether the front edge of the window has been reached.

When the front edge of the window, i.e. the expected area along the belt within which the next antenna is expected to be found, has been reached as detected at block 375, the rear edge of the window is calculated at block 377. Several additional steps may occur following the calculation in block 377, as is represented by the broken interrupted line at 377a; ultimately at block 378 an inquiry is made to detect whether an antenna is present. When the antenna is present at the rip detector station 11 causing a DC pulse to be produced in the detector amplifier 32, there is a delay of about 20 milliseconds, block 381, and at block 382 the computer 26 again looks to see whether an antenna is present at the station 11. If no antenna is present at such second look, it is presumed that the earlier sensed antenna was just electrical noise. However, if an antenna is sensed at the second look at block 382, the program follows line 386 shown in FIG. 5.

At block 200, which occurs just after the detection of an antenna has occurred at block 382, a variable "AV" is updated. The variable AV is a summation of information proportionally representative of signal strength in the detector amplifier 32. Moreover, in block 201 a further variable NUMB is incremented by one. The variable NUMB is a counter of the number of antennas that have been detected up to that point in operation of the monitor system 1 since the last adjustment of gain had been made in the detector amplifier 32 (FIG. 1). The variable NUMB is used in the ADJUST sub-routine of block 202 for the purpose of allowing the latter to effect operation of the computer 26 to cause operation of a signal control apparatus in the detector amplifier 32 to make an appropriate gain adjustment. The ADJUST sub-routine of block 202 is called only before the front edge of a window has been reached, which is sensed at block 375. Therefore, adjusting of the gain in the signal control apparatus may not occur while the monitor system 1 is searching for the next antenna within a window. From block 201 the flow chart follows line 386b to block 385 for pulsing of the antenna light (not shown), to indicate visually that an antenna has been detected. The detailed description concerning blocks 200, 201 and 202 is presented in the latter Doljack application.

A variable MISS is set to zero at block 402 each time an antenna has been detected at block 382. MISS is a counter variable having a value representing the number of antennas already missed in the immediately sequentially preceding locations at which antennas were expected to occur. MISS is used in the self-delete sub-routine of FIG. 6.

Following the portion 386c of line 386 an UPDATE sub-routine is called at block 359', such sub-routine being described in detail in the earlier copending application. Following line 359a', which is broken and interrupted indicating that several steps may occur there, as is described in the copending application particularly with reference to FIG. 10C, a sub-routine DECHECK, which is described in the copending application, is called at block 360'. After completing the DECHECK sub-routine, line 360a' is followed back to line 366, whereupon the front edge of the next window is calculated to commence an operation looking for detection of the next antenna along the belt.

Turning back to the initializing sub-routine 400 in FIG. 5, at block 404 the value of the variable MISS is set to zero and the value of a further variable NUMANT is set to the number of locations used in the table 70 (FIG. 4) at initial starting of the belt and monitor system 1. Thus, the value of NUMANT is the number of antennas (events) believed operational and for which location data is stored in the table 70. At block 406 an inquiry is made to learn whether the value of NUMANT is greater than a predetermined value, which has a relationship to the minimum number of antennas believed necessary to be operational in the belt in order to provide adequate accuracy of rip detector operation and self-delete operation to minimize nuisance shut-downs. However, as will become more apparent from the following description, if the value of NUMANT at block 406 is less than the prescribed value, then the self-delete feature of the invention will be bypassed or made non-operational; to effect such a bypass, line 408 would be followed to block 410 at which a variable "DEFAL" is set to a value of one. The variable DEFAL represents a fractional or percentage amount of the antennas of the total number of operational antennas at the start of operation of the monitor system 1 or at the time of the last warning shut-down, whichever occurred most recently. The value of DEFAL is in a sense a de-sensitizing factor reducing sensitivity of the monitor system 1 at the location at which respective antennas may have been deleted, to avoid nuisance shut-downs while also requiring consideration of any problems, system check-out or at least a system shut-down and re-start when the number of antennas no longer operational since initial start-up or since the last warning shut-down equals the DEFAL value. Accordingly, if the value of NUMANT at block 406 is greater than the prescribed value there, at block 412 the value of DEFAL is calculated to be the fractional or percentage amount, in the preferred embodiment one-eighth, of the value of NUMANT. With the values of MISS, NUMANT and DEFAL now initialized in the initializing sub-routine 400 just described, the flow chart illustrated in FIG. 5 would continue generally as aforesaid. It is noted here that the blocks 406, 410 and 412 and, more particularly, the functions related thereto, as was just described, are a sub-routine defined by the label "RECALC", which will be referred to further below.

Continuing in FIG. 5, after the rear edge of a window has been calculated at block 377, if an antenna is not sensed at block 378, then at block 414 an inquiry is made to learn whether the rear edge of the window has been reached. If the rear edge has not been reached at block 414, then the flow chart follows in a loop via line 377a to block 378 to inquire again whether an antenna is present, and that loop will continue until either an antenna is detected at block 378 or the rear edge of the window has been reached at block 414. In the latter case, i.e. the rear edge is reached, at block 416 an inquiry is made whether the variable MISS equals a consent value of one; whereupon line 418 is followed to block 420 to stop the belt 3. The consent value, in the preferred embodiment one, about which inquiry is made at block 416 is the maximum number of sequentially occurring events (antennas) that have been missed for the first time in the cyclical progress of the process (belt movement) after which a sensing that the sequentially next event is missing the monitor system 1 will stop the process at block 420. It will be appreciated, therefore, that the consent value in block 416 may be increased, if desired, but such an increase will reduce the overall sensitivity or accuracy of the monitor system 1; whereas, using the self-delete feature of the invention further reduction in accuracy or sensitivity is effected only at localized areas in the belt.

If the value of MISS is not equal to the consent value of block 416, then an inquiry is made at block 422 to learn whether the detector amplifier 32 is capable of detecting a radio frequency signal from the receiver plate 13 (FIG. 1); if not, via line 424 the flow chart enters a failure mode, namely the FAIL sub-routine described in greater detail in application Ser. No. 960,424. If the answer at block 422 is affirmative, then at block 426 the value of MISS is set to one so that if the next event is missed, the consent value of block 416 will be achieved so that the belt will be stopped at block 420. Following block 426, at block 428 an inquiry is made whether the value of DEFAL equals a consent value of one. If affirmative, then line 430 is followed to block 420 stopping the belt. If the answer at block 428 is negative, then the self-delete sub-routine is called at block 432. The purpose for the inquiry made at block 428 is tied to the setting of DEFAL at block 410. More particularly, if the number of antennas in the belt is below a value previously determined to be the minimum number desired for adequate sensitivity and accuracy of rip detector function, then the further inaccuracies or sensitivity reduction effected in the self-delete sub-routine would be undesirable and movement of the computer program flow chart into the self-delete sub-routine would be prevented.

Figure 6:
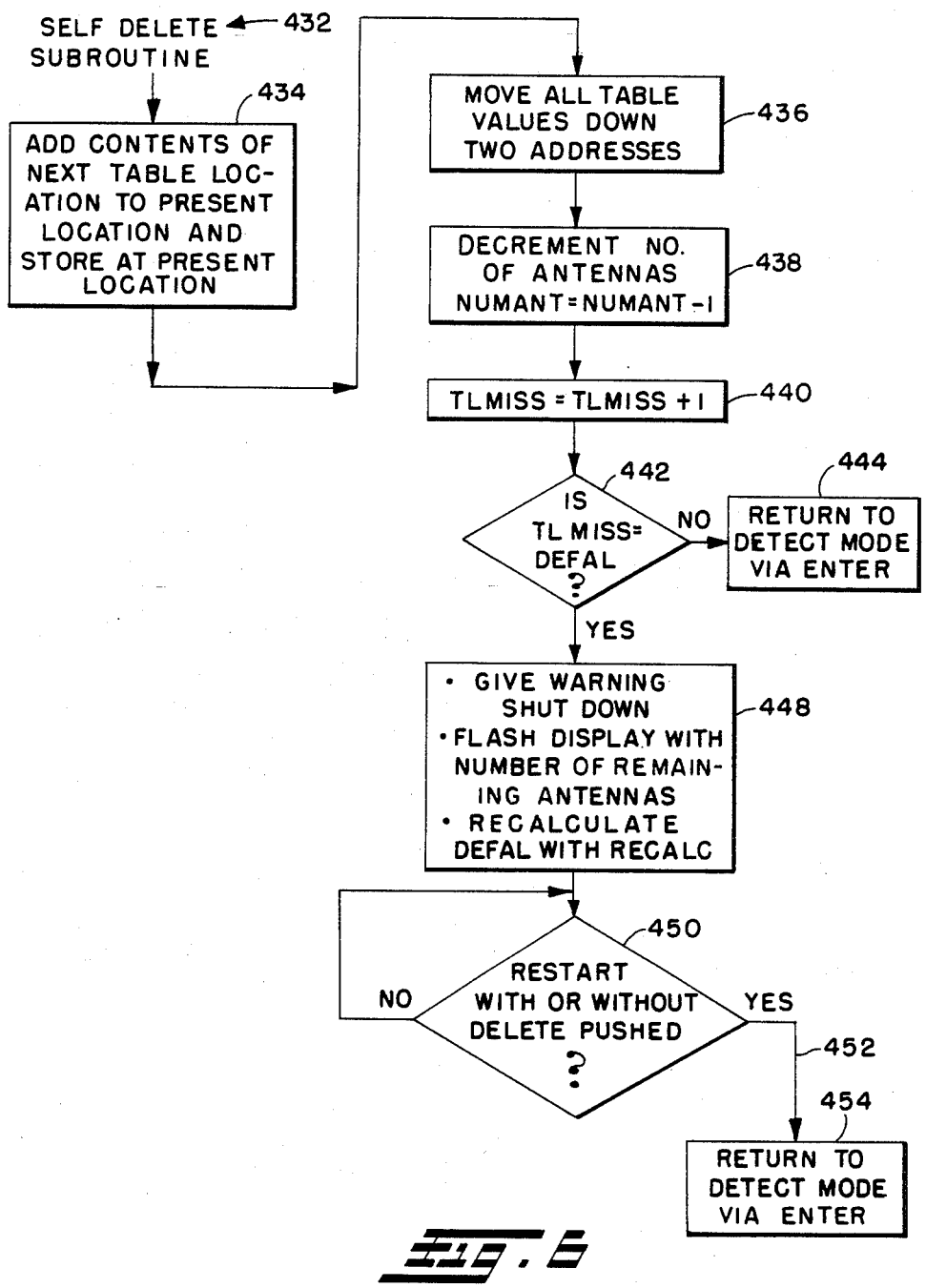
FIG. 6 illustrates a representative flow chart of procedures and steps followed in operation of the self-delete control arrangement of the overall monitor system.

Referring now to FIG. 6, the self-delete sub-routine of block 432 is illustrated in detail. The self-delete sub-routine is entered when an antenna has been missed, there is believed to be an adequate number of antennas in the belt (as checked at block 406), and the missed antenna is not the second sequential one missed (as checked at block 416). When so entered, the self-delete sub-routine effects at block 434 and 436 the deleting operation described above particularly with reference to the tables 70, 70' and 70" of FIG. 4. Thus, at block 434 the contents of the next table location following the present location are added to that of the present location and the sum is stored at the present location (this being analogous to the combining of the values E and F in the tables of FIG. 4). At block 436 all of the values in the subsequent table locations are moved up in the table to fill the empty location vacated by the value F. In the preferred embodiment each table location is identified by two addresses to permit the table values to be represented by two 8-bit or one 16-bit binary number; thus, at block 436 the table values are described as being moved down two addresses.

It is now known that the total number of antennas operational in the belt and represented by table locations in table 70 has been reduced by one; therefore, at block 438 the value of the variable NUMANT is decreased by one.

At block 440 a further variable "TLMISS" is incremented by one. The variable TLMISS represents the total number of antennas missed since the initial start-up of the monitor system 1 or since the last warning shut-down occurred. Ordinarily the variable TLMISS would be initialized at zero at block 404 just prior to entering the RECALC sub-routine and the rip detector mode which effectively commences at block 365. Moreover, the variable TLMISS ordinarily also would be initialized at zero each time the monitor system 1 and conveyor belt system 2 are re-started using the restart with delete switch 118 or the re-start without delete switch 121 (FIG. 1) which are coupled via a random access memory 103 to the central processor unit of the computer 26 as described in greater detail in the patent application Ser. No. 960,424 now U.S. Pat. No. 4,228,513 issued Oct. 14, 1980.

At block 442 an inquiry is made to learn whether the value of TLMISS has been incremented to a value equal to that of the variable DEFAL; if the answer is negative, then the self-delete sub-routine returns via block 444 to the line 446 labeled "enter" for re-entering the automatic rip detector mode flow chart program of FIG. 5. However, if the answer at block 442 is affirmative, then at block 448 a warning shut-down of the system 2 will be caused. Moreover, at block 448 a flashing of the display 27 will be effected to display the number of remaining operational antennas thought to be in the belt 3. Moreover, the value of DEFAL will be recalculated using the above-mentioned RECALC sub-routine employing blocks 406, 410 and 412 (FIG. 5).

In view of the foregoing, it will be understood that the self-delete sub-routine effects automatic deleting from the table 70 (and thus searching for) a percentage or fractional amount of the total number of the antennas believed to have been operational at the time the conveyor belt 3 was started initially or subject to a re-start, whichever last occured. When the prescribed percentage or fractional number of antennas represented by the value of DEFAL has been deleted since the last starting or re-starting of the belt, as aforesaid, the monitor system 1 will effect a warning shut-down of the belt requiring a field worker to effect a manually initiated re-starting generally after a visual inspection of the belt and/or further inspection of the monitor system equipment.

Accordingly, at block 450 an inquiry is made whether the re-start with or without delete switches 118, 121 (FIG. 1) has been pushed to effect a re-start, as aforesaid. If such a switch has been pushed, the computer program flow chart follows line 452 and block 454 to line 446 (FIG. 5) to re-enter the automatic rip detect mode of operation for the monitor system 1.

Briefly summarizing the mode of operation of the present invention, the occurrences of a plurality of events in a cyclical process is monitored by storing information concerning the expected position of each event in the process, detecting the occurrence of each event in the process, simultaneously detecting the progress of the process, and sensing whether respective events occur at expected positions in the progress of the process. Moreover, automatically the detecting and sensing operation is prevented from detecting and sensing a prescribed event at its expected position when such prescribed event has not been sensed during a predetermined number of cycles of the process. Preferably the process is the operation of an endless type conveyor belt, the step of detecting the occurrence includes checking specified portions of the conveyor belt as they pass a rip detector station to find a rip in the conveyor belt whereby an undetected event at its expected position during the sensing step may be interpreted as a rip, the checking includes coupling a signal from a transmitter to a receiver each time an event occurs, and the automatically preventing includes preventing the checking when during the corresponding checking of a predetermined specified portion of the belt in a preceding cycle of such belt a signal had not been coupled between such transmitter and receiver.

It will be understood that the computer program flow chart disclosure described above and illustrated in the drawings may be reduced by those having ordinary skill to computer program machine language or higher level language for effective operation of the computer 26 to control the monitor system 1.

STATEMENT OF INDUSTRIAL APPLICATION

It will be appreciated that the monitor system 1 and particularly the self-delete features of the present invention employed therewith may be used to monitor and control the process in which a plurality of sequential events occur in a cyclical manner at selected known positions in the process while minimizing nuisance shutdowns of the process without severely curtailing the sensitivity or accuracy of the monitor system in its monitoring function.

I claim:

1. A monitoring apparatus for monitoring the occurrence of a plurality of events in a cyclical process, comprising event transducer means for detecting the occurrence of such events in such process, progress transducer means for detecting the progress of such process, search means for searching for events by sensing whether respective events occur at expected positions in the progress of such process, and self-delete means operative while such process is continuing for automatically preventing said search means from searching for a prescribed event at its expected position when such prescribed event is not sensed during a predetermined number of cycles of such process.

2. The apparatus of claim 1, further comprising start-stop control means for starting and stopping such process, and said search means comprising computer means for sensing whether respective events occur at expected positions in the progress of such process, said computer means being coupled to said start-stop control means to operate the same to stop such process when a prescribed number of events has been missed.

3. The apparatus of claim 2, said computer means comprising means for operating said start-stop control means to stop such process when more than one sequentially expected events are not sensed at expected positions in the progress of such process.

4. The apparatus of claim 3, said computer means comprising means for operating said start-stop control means to stop such process when two sequentially expected events are not sensed at expected positions in the progress of such process.

5. The apparatus of claim 1, further comprising means for stopping such process when said self-delete means has automatically prevented said search means from searching for a prescribed number of events.

6. The apparatus of claim 5, further comprising means for determining such prescribed number of events as a function of the number of events in a cycle of such process.

7. The apparatus of claim 6, said means for determining comprising means for taking a prescribed fractional amount rounded to a whole number of the total number of events remaining in one cycle of such process at the occurrence of the start of such process or at the last stopping of such process.

8. The apparatus of claims 6 or 7, further comprising means for checking whether the total number of events in one cycle of such process for which said search means may search is less than a minimum, and said means for determining further comprising means for setting such prescribed number of events to one when such total number of events is less than such minimum.

9. The apparatus of claims 1, 2, 3 or 5, said self-delete means comprising means for preventing such searching when a prescribed event has not been sensed during the immediately preceding cycle of such process.

10. The apparatus of claims 1, 2, 3, or 5, said event transducer means comprising conveyor belt rip detector means for monitoring the integrity of a conveyor and such process comprising cyclical operation of such conveyor, said rip detector means comprising a transmitter and a receiver, and signal coupling means associated with such conveyor for periodically, according to the progress of such conveyor, coupling a signal from said transmitter to said receiver, as an indication of such event and, thus, of such integrity, said self-delete means comprising means for automatically preventing said search means from searching when said signal coupling means is ineffective to couple at least a signal of predetermined magnitude between said transmitter and receiver.

11. The apparatus of claim 1 or 2, further comprising display means for displaying the number of events remaining in such process.

12. The apparatus of claim 10, further comprising display means for displaying the number of signal coupling means effective to couple at least a signal of predetermined magnitude between said transmitter and receiver.

13. The apparatus of claim 1, further comprising storage means for storing information concerning the distance between adjacent pairs of events.

14. The apparatus of claim 13, further comprising means responsive to the sensing of the occurrence of an event for extracting from said storage means information concerning the expected position of the following event and means responsive to such extracted information for causing said search means to search for such following event at such expected position.

15. The apparatus of claim 14, said self-delete means comprising means for revising the stored information concerning the distance of such event from the preceding event to a combination of such information with the stored information concerning the distance of the following event.

16. The apparatus of claims 2, 3, or 5, further comprising means for restarting such process by causing said search means to assume that the undetected event was detected only in the current cycle of such process.

17. The apparatus of claims 2, 3, or 5, further comprising storage means for storing information concerning the distance between adjacent pairs of events, and means for preventing said means for sensing from searching for a selected event after said start-stop control means has stopped said process by revising the stored information concerning the distance of such event from the preceding event to a combination of such information with the stored information concerning the distance of the following event, said means for preventing including means for restarting such process after such preventing.

18. A method for automatically monitoring the occurrence of a plurality of events in a cyclical process, comprising storing information concerning the expected position of each event in such process, detecting the occurrence of such events in such process, simultaneously detecting the progress of such process, sensing whether respective events occur at expected positions in the progress of such process, and while such process is continuing automatically preventing such detecting and sensing for a prescribed event at its expected position when such prescribed event has not been sensed during a predetermined number of cycles of such process.

19. The method of claim 18, further comprising automatically stopping such process when a prescribed number of events has been missed.

20. The method of claim 19, said automatically stopping comprising automatically stopping such process when more than one sequentially expected event have not been sensed at expected positions in the progress of such process.

21. The method of claim 20, said automatically stopping comprising automatically stopping such process when two sequentially expected events have not been sensed at expected positions in the progress of such process.

22. The method of claim 18, further comprising stopping such process when in the course of such process such steps of automatically preventing has prevented detecting and sensing a predetermined number of prescribed events.

23. The method of claim 22, further comprising determining such predetermined number of prescribed events as a function of the number of events in a cycle of such process.

24. The method of claim 23, said determining comprising taking a prescribed fractional amount rounded off to a whole number of the total number of events remaining in one cycle of such process at the occurrence of the start of such process or at the last stopping of such process.

25. The method of claim 23, further comprising checking the total number of prescribed events in one cycle of such process and when such total number is less than a prescribed number stopping such process promptly upon missing a single event.

26. The method of claims 18 or 19, further comprising displaying the number of events in such process.

27. The method of claim 22, further comprising automatically stopping such process when two sequentially expected events have not been sensed at expected positions in the progress of such process.

28. The method of claims 18, 19 or 22, wherein such process is the operation of an endless type conveyor belt, said step of detecting the occurrence comprises checking specified portions of such conveyor belt as they pass a rip detector station to find a rip in the conveyor belt whereby a prescribed number of undetected events where expected during said sensing step is interpreted as a rip in the conveyor belt, said checking comprises coupling a signal from a transmitter to a receiver each time an event occurs, and said step of automatically preventing comprising preventing such checking when during the corresponding checking of a predetermined specified portion of such belt in a preceding cycle of such belt a signal had not been coupled between such transmitter and receiver.

29. The method of claim 28, said coupling comprising using signal coupling means the operational integrity of which ordinarily represents the integrity of such belt, and further comprising displaying the number of operational signal coupling means in the belt.

30. The method of claims 19, or 22, further comprising after such process has been stopped, restarting such process and automatic monitoring of events.

31. The method of claim 30, further comprising storing information concerning the expected position of each event in such process including obtaining distance information concerning the distance between adjacent events and storing such distance information, and said step of restarting further comprising revising the stored distance information by combining the distance information concerning the distance from the previously detected event to the expected position of the undetected event with the distance information concerning the distance from the expected position of the undetected event to the expected position of the next event, and deleting the latter distance information from storage.

32. The method of claim 18, further comprising storing information concerning the expected position of each event in such process including obtaining distance information concerning the distance between adjacent events and storing such distance information, and said step of automatically preventing comprising revising the stored distance information by combining the distance information concerning the distance from the previously detected event to the expected position of the undetected event with the distance information concerning the distance from the expected position of the undetected event to the expected position of the next event, and deleting the latter distance information from storage.

* * * * *